(No Model.) 3 Sheets—Sheet 1.

W. F. GOODHUE.
SEWAGE DISPOSAL APPARATUS.

No. 584,736. Patented June 15, 1897.

(No Model.) 3 Sheets—Sheet 2.
W. F. GOODHUE.
SEWAGE DISPOSAL APPARATUS.

No. 584,736. Patented June 15, 1897.

Witnesses
Geo. W. Young
Chas. L. Goss

Inventor:
William F. Goodhue
By Butler, Fonder Smith & ...
Attorneys.

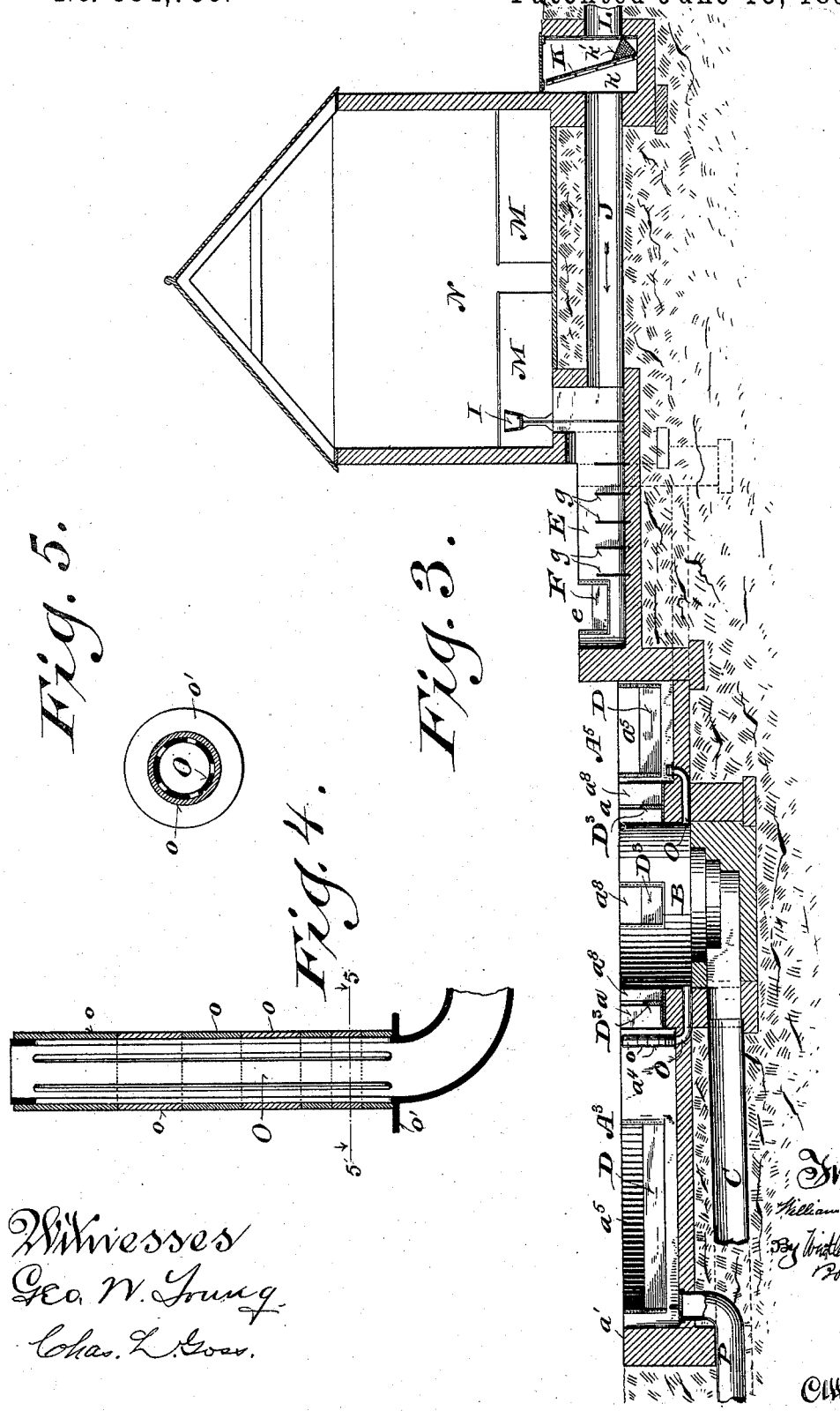

UNITED STATES PATENT OFFICE.

WILLIAM F. GOODHUE, OF MILWAUKEE, WISCONSIN, ASSIGNOR OF ONE-THIRD TO ANDREW S. MITCHELL, OF SAME PLACE.

SEWAGE-DISPOSAL APPARATUS.

SPECIFICATION forming part of Letters Patent No. 584,736, dated June 15, 1897.

Application filed July 18, 1896. Serial No. 599,678. (No model.)

*To all whom it may concern:*

Be it known that I, WILLIAM F. GOODHUE, of Milwaukee, in the county of Milwaukee and State of Wisconsin, have invented certain new and useful Improvements in Sewage-Disposal Apparatus; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The main object of my invention is to economically separate the sludge from sewage and to render the water or liquid part of the sewage inoffensive and harmless.

It consists in certain novel features in the apparatus hereinafter particularly described, and defined in the claims.

In the accompanying drawings like letters designate the same parts in the several views.

Figure 1:
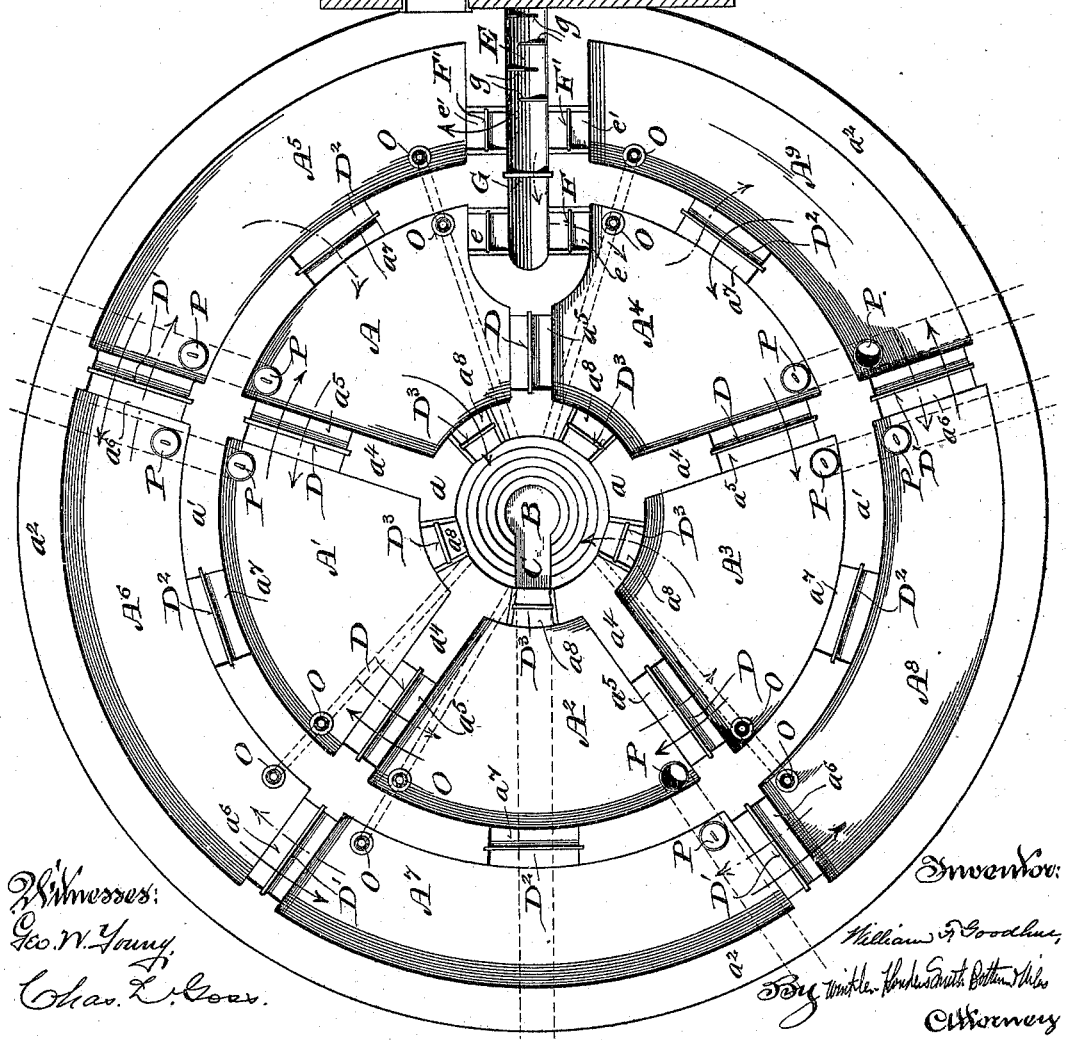
Figure 2:
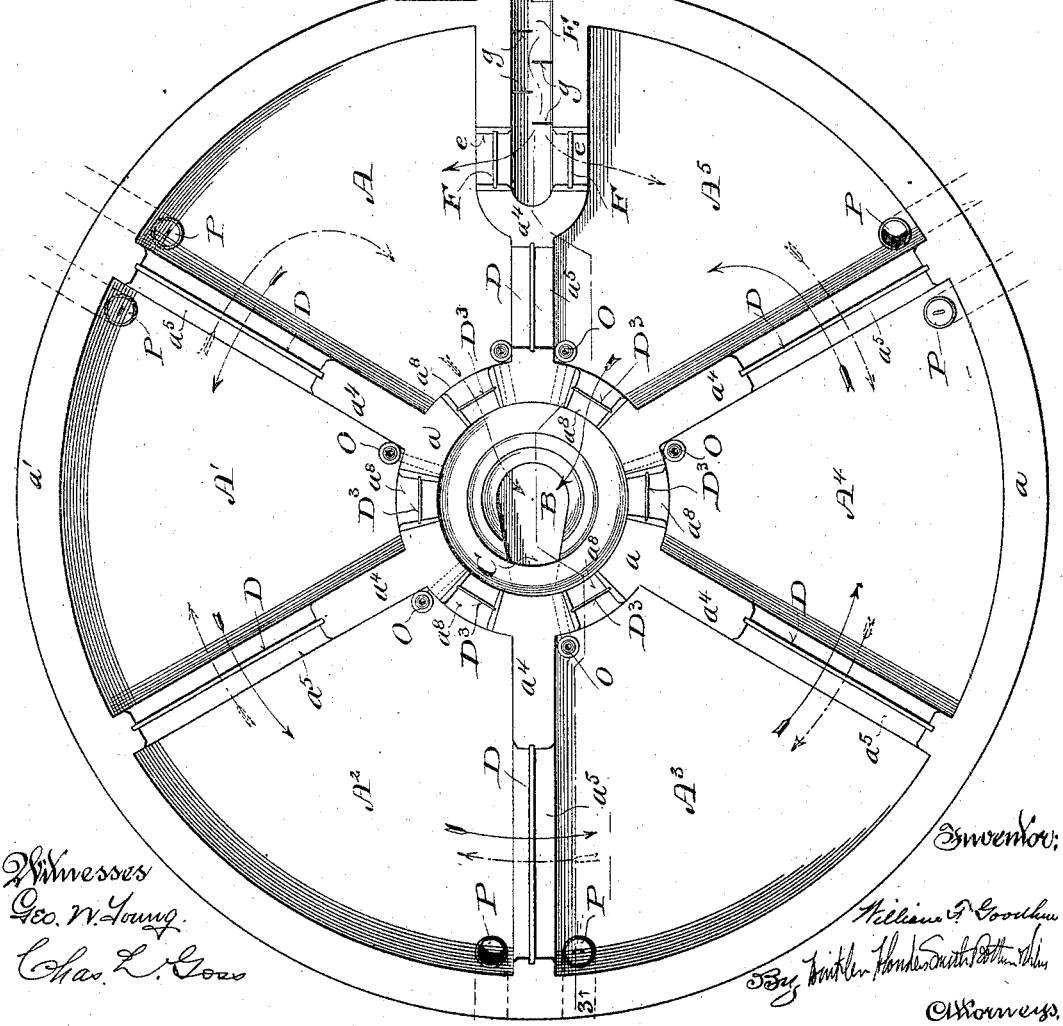

Figure 1 is a plan view of apparatus embodying my invention. Fig. 2 is a like view of a modified form of the same. Fig. 3 is a vertical section on the line 3 3, Fig. 2. Fig. 4 is a vertical medial section, on an enlarged scale, of one of the drain-pipes for drawing off the water from the settling-basins to any desired level; and Fig. 5 is a horizontal section of the same on the line 5 5, Fig. 4.

Referring to Fig. 1, A to $A^9$ designate settling-chambers arranged in two concentric circular series and formed by circular or polygonal walls $a$ $a'$ $a^2$, of masonry or other suitable material, and radially-arranged partitions $a^4$ $a^4$. The several basins of the inner series communicate with each other through openings or passages $a^5$ $a^5$, and the several basins of the outer series communicate with each other through openings or passages $a^6$ $a^6$ in the partitions $a^4$ $a^4$. The several basins of the inner series communicate with the basins of the outer series through openings or passages $a^7 a^7$ in the circular wall $a'$. Within the inner circular wall $a$ is formed a well B, extending in a series of steps to a level below that of the bottoms of the several settling-basins. From this well an outlet channel or conduit C extends outwardly underneath the settling-basins at a sufficient descending pitch to readily carry off the water from which the sludge has settled in the basins A, &c. Openings or passages $a^8$ $a^8$ are formed in the inner wall $a$ between the several basins of the inner series and the overflow-well B. The several openings or passages $a^5$, $a^6$, $a^7$, and $a^8$ are provided with gates or weirs D, D', $D^2$, and $D^3$, respectively, which are fitted and loosely held at the ends in vertical grooves or ways in the sides of said openings, as shown in Figs. 1, 2, and 3. They are thus made readily removable and may be replaced by those of greater or less height. Their height may be varied also by making them in sections and adding or taking away sections. In either of these ways or in any other convenient manner the gates or weirs may be adjusted and arranged to completely cut off communication between adjoining basins and between any basin and the central well or to connect any number of basins in series and maintain the sewage at any desired level or at different levels in the several connected basins, causing it to overflow from one into another in any desired order or direction, as indicated by arrows in Figs. 1 and 2.

E is an open sewer extending radially inward through the walls $a^2$ and $a'$ of the settling-basins and preferably at a level somewhat higher than said basins, as shown in Fig. 3. Openings or passages $e$ and $e'$ are formed in the side walls of this sewer into basins of the inner and outer series, respectively. These openings or passages are provided with removable or adjustable gates or weirs F F', respectively, and the sewer itself is provided between the openings or passages $e$ $e'$ with a removable or adjustable gate or weir G. It is also provided with baffles $g$ $g$, projecting into it alternately from opposite sides, so as to retard the flow of sewage and to thoroughly mix therewith the chemicals with which it is supplied from a tank H and troughs I I.

The open sewer E is connected by a closed or covered conduit J with a well K, into which the sewer-main L discharges, as shown in Fig. 3. The well K is furnished with a screen $k$, provided at or near the bottom on the side toward the sewer-main with a basket $k'$ for holding the coarse material carried by the sewage into said well and retained therein by said screen, so that when the screen is removed such material will be carried with it.

The chemical tank and troughs H and I I are preferably housed, with bins M M for holding a supply of chemicals, in a suitable building, (designated N.) Each of the several settling-basins A, &c., is provided with a drain-pipe O, projecting vertically into the same, as shown in Fig. 3, and leading therefrom below the bottom of the basins into the overflow-well B. The vertical portion of each drain-pipe above the bottom of the basin is slotted vertically and provided with a series of rings $o\ o$, loosely passing over it and fitted together edge to edge, as shown in Figs. 4 and 5, so as to close said drain-pipe to any desired level. Said pipe is formed or provided with a flange $o'$ to rest upon and form a tight joint with the bottom of the basin, and it extends upwardly therefrom approximately to the top of the basin. The valve-rings $o\ o$, with which the slotted portion of the pipe is surrounded, are made of varying width, preferably decreasing from top to bottom, as shown in Figs. 3 and 4. By this means the water from which the sludge has been precipitated in each settling-basin can be rapidly drawn off by removing the wider rings, and as it approaches the level of the sludge it is gradually drawn off more slowly by removing the narrower rings, so as not to disturb or agitate the sludge at the bottom. Each basin is also provided with a pipe or conduit P, leading out from the bottom thereof, for drawing off the sludge. The opening into this pipe or conduit is normally closed by a cover or other suitable closure.

Referring to Fig. 2, illustrating a modification of the apparatus, but one series of settling-basins is provided. Otherwise the apparatus is substantially like that shown in Fig. 1, being intended for a plant of smaller capacity. Any number of series of settling-basins may be employed, arranged substantially as shown in Fig. 1, according to the volume of sewage to be disposed of.

My improved apparatus operates as follows: The sewage is discharged from the main L into the well K, where the coarse material contained therein is caught by the screen $k$ and held in the basket $k'$, in which it is removed with the screen from time to time. Passing through the closed conduit J it flows into the open sewer E and is supplied from the troughs I I with suitable chemicals for decomposing the organic matter contained therein or rendering it harmless and inoffensive. These chemicals are thoroughly mingled with the sewage as it passes in a sinuous course between and around the baffles $g\ g$. The lower gate or weir $F'$ and the gate or weir G being closed or raised, so as to prevent the passage of sewage, and the upper gate $F'$ opened or lowered, the sewage will flow first into the basin $A^5$. Gates or weirs $D'$, gradually decreasing in height, being provided in the openings $a^6$ of the outer series from right to left, a still lower gate or weir $D^2$ in the opening $a^7$ between the basins $A^4$ and $A^9$, gates or weirs of gradually-decreasing height in the openings $a^5$ between the basins of the inner series from left to right, and a still lower gate or weir in the opening $a^8$ between the basin A and the overflow-well B, all the other openings between said basins being closed, the sewage will gradually flow from one basin into another in the course indicated by the full-line arrows, and finally the surplus water or liquid from which the solid portion or sludge of the sewage has been precipitated will flow over the last weir into the well B. In passing over the steps in the bottom of said well it is thoroughly agitated and aerated and by the time it reaches the discharge-conduit C has become comparatively limpid and completely deodorized, so that it flows from said conduit in an inoffensive and innocuous condition. By changing the arrangement of the gates or weirs and varying their height the course of the sewage through the settling-basins may be reversed, as indicated by the dotted arrows, or it may be shut out from any one or more of the basins for the purpose of removing the sludge therefrom or making repairs and caused to flow in any desired direction or order through the remaining basins of the apparatus. The operation of the simpler form of apparatus (shown in Fig. 2) is substantially the same and will be readily understood from the foregoing explanation and by reference to the arrows, indicating two out of several different courses that the sewage may take through the apparatus. It is obvious that by a proper arrangement of the gates or weirs any one or more of the settling-basins may be cut out while the others continue in operation, as, for instance, the basin $A^2$ may be shut off and the sewage led into both basins A and $A^4$ from the sewer E, thence into the basins $A'$ and $A^3$, which are in such case both caused to overflow into the well B, or the sewage may be led into either of the basins A or $A^4$ and thence in either direction through any desired number of basins, the last one of which is caused to overflow into said well.

While the settling-basins are in operation their overflow-pipes O are provided with valve-rings $o\ o$ to a sufficient height to prevent the sewage from passing into said pipes. The conduits P are also closed. As the sewage flows slowly through the several settling-basins in succession, the solid matter which it contains will be gradually participated until the liquid in the upper part of the last basin of the series is sufficiently purified and clear. From the last basin of each series through which the sewage is conducted for the separation of the sludge the clarified liquid overflows the weir $D^3$ in opening $a^8$ into the well B. When the sludge has been deposited in any basin to a certain depth or it is desired to remove it, that basin is cut off from the rest of the apparatus by closing the gates or raising the weirs in the openings between it and the adjoining basins. The sewage contained therein is allowed to stand until the upper liquid portion becomes clear, whereupon the upper rings of the drain-pipe O therein are removed one after another from the top, thus allowing the clear liquid to flow off through said pipe into well B. This operation is continued until the liquid is lowered to the level of the sludge or until the liquid begins to be turbid. The cover of the conduit P, leading out of said basin, is then removed or opened and the sludge drawn off and discharged at any convenient point. The sludge thus taken from the apparatus may be disposed of in any convenient manner, according to circumstances. It may be conducted off in the condition in which it is taken from the apparatus for use as a fertilizer in the neighborhood of the apparatus or it may be dried and transported to greater distances for like use.

I do not wish to be understood as limiting myself to exact details of construction herein shown and described, as they may be variously modified within the spirit and intended scope of my invention.

Apparatus constructed in accordance with my plan as herein shown and described is economical in operation, requiring no expensive chemicals or materials and but little attention, except to remove the sludge from time to time from the several settling-basins, which does not interfere with the operation of the apparatus. It is capable of disposing of a large volume of sewage within a comparatively small space or compass, and effectively separates the sludge therefrom and renders the liquid inoffensive and harmless, so that it may be discharged when it leaves the apparatus into a natural stream or watercourse without objection.

The apparatus is particularly adapted to inland villages and cities which do not have a natural drainage or outlet for their sewage, and may be used to advantage in any place where provision for the disposal of sewage is necessary or desirable.

I claim—

1. In sewage-disposal apparatus the combination of a series of settling-basins arranged around an overflow-well and separated from each other by radial partitions, adjustable gates or weirs between said basins and said well and in the radial partitions between the basins, an inlet-conduit having gates opening into two or more different basins, and an outlet leading out of the bottom of said well, substantially as and for the purposes set forth.

2. In sewage-disposal apparatus the combination of an overflow-well, an outlet-conduit leading therefrom, a series of settling-basins arranged around said well, adjustable gates or weirs between said well and the several basins, similar gates or weirs between the several adjoining basins, an inlet-conduit having gates opening into adjoining basins and overflow-pipes leading from the several basins into said well and arranged to allow liquid to flow from said basins to different levels as desired, substantially as and for the purposes set forth.

3. In sewage-disposal apparatus the combination of a central overflow-well the bottom of which is formed in a series of steps, an outlet-conduit leading from the bottom of said well, a series of settling-basins arranged around said well and separated from each other by radial partitions, adjustable gates or weirs between the well and the several basins, similar gates or weirs in the radial partitions between adjoining basins and an inlet-conduit having gates opening into adjoining or adjacent basins, substantially as and for the purposes set forth.

4. In sewage-disposal apparatus the combination of an overflow-well, a series of settling-basins arranged around said well, adjustable gates or weirs between the well and the several basins, similar gates or weirs between adjoining basins, an outlet-conduit leading from said well below the bottoms of said basins, drain-pipes leading from the several basins into said well and provided in the basins with means of adjusting the height of their intake-openings, conduits provided with gates or closures leading out from the bottoms of said basins for drawing off the sludge therefrom and an inlet-conduit having gates opening into adjoining basins, substantially as and for the purposes set forth.

5. In sewage-disposal apparatus the combination of an overflow-well, a series of basins arranged around it and separated from each other by radial partitions, adjustable gates or weirs between said well and the several basins, similar gates or weirs in the radial partitions between adjoining basins, an outlet-conduit leading from said well below said basins, an inlet-conduit having gates opening into two or more different basins and provided with baffles projecting into it alternately from opposite sides and a receptacle for chemicals provided with means of feeding chemicals into the sewage in said inlet-conduit, substantially as and for the purposes set forth.

6. In sewage-disposal apparatus the combination of an overflow-well, a series of settling-basins arranged around it and separated from each other by radial partitions, adjustable gates or weirs between said well and the several basins, similar gates or weirs in the radial partitions between adjoining basins, an outlet-conduit leading from said well below said basins, an inlet-conduit having gates opening into two or more different basins and a well out of which said conduit leads and into which the sewer-main discharges, provided with a removable screen having a basket at the bottom, substantially as and for the purposes set forth.

7. In sewage-disposal apparatus the combination of an overflow-well having a series of descending steps or ledges at the bottom, a series of settling-basins surrounding said well and separated from each other by radially-arranged walls or partitions, vertically-adjustable gates or weirs between said well and the several basins, similar gates or weirs in the walls or partitions between said basins, an outlet-conduit leading from said well below said basins, an open inlet-conduit having gates opening into adjoining basins and provided with baffles, a receptacle for chemicals provided with means for delivering such chemicals at the desired rate into said inlet-conduit, and a well out of which said conduit leads and into which the sewer-main discharges, provided with a removable screen having a basket at the bottom, substantially as and for the purposes set forth.

8. In sewage-disposal apparatus the combination with a settling-basin of a drain-pipe projecting upwardly and opening laterally into said basin and provided with a series of valve-rings fitting loosely over it, substantially as and for the purposes set forth.

9. In sewage-disposal apparatus the combination with a settling-basin of a drain-pipe projecting upwardly and opening laterally into said basin and provided with a series of separately-removable valve-rings fitting loosely over it and gradually decreasing in width from top to bottom, substantially as and for the purposes set forth.

10. In sewage-disposal apparatus the combination of a central overflow-well, settling-basins surrounding said well in a number of circular series and separated from each other by radially-arranged walls or partitions, adjustable gates or weirs between said well and the several basins of the inner series, similar gates or weirs in the partitions between the several adjoining basins, an outlet-conduit leading from said well below said basins, and an inlet-conduit having gates opening into adjoining basins of each series, substantially as and for the purposes set forth.

In testimony that I claim the foregoing as my own I affix my signature in presence of two witnesses.

WILLIAM F. GOODHUE.

Witnesses:
ERNEST SHULT,
CHAS. L. GOSS.